(12) United States Patent
DelMarco et al.

(10) Patent No.: US 12,467,720 B2
(45) Date of Patent: Nov. 11, 2025

(54) HIGH-PRECISION INFANTRY TRAINING SYSTEM (HITS)

(71) Applicant: BAE SYSTEMS Information and Electronic Systems Integration Inc., Nashua, NH (US)

(72) Inventors: Stephen P. DelMarco, North Andover, MA (US); Simone B. Bortolami, Belmont, MA (US); Helen F. Webb, Malden, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1064 days.

(21) Appl. No.: 17/501,824

(22) Filed: Oct. 14, 2021

(65) Prior Publication Data

US 2025/0224207 A1    Jul. 10, 2025

(51) Int. Cl.
*F41G 3/14*    (2006.01)
*F41G 3/26*    (2006.01)

(52) U.S. Cl.
CPC ............... *F41G 3/142* (2013.01); *F41G 3/26* (2013.01)

(58) Field of Classification Search
CPC .................................. F41G 3/142; F41G 3/26
See application file for complete search history.

(56) References Cited

U.S. PATENT DOCUMENTS

| | | |
|---|---|---|
| 9,766,074 B2 | 9/2017 | Roumeliotis et al. |
| 10,012,504 B2 | 7/2018 | Roumeliotis et al. |
| 10,107,919 B1 | 10/2018 | Chapman et al. |
| 10,151,588 B1 | 12/2018 | Singh et al. |
| 10,254,118 B2 | 4/2019 | Roumeliotis et al. |

(Continued)

FOREIGN PATENT DOCUMENTS

WO    2016174659 A1    11/2016

OTHER PUBLICATIONS

Delmarco, S., Webb, H., and Tom, V., "Spectrally-Shaped Correlation with Application to Image Registration," Proceedings of SPIE, vol. 10993, 2019.

(Continued)

*Primary Examiner* — Laura A Gudorf
(74) *Attorney, Agent, or Firm* — Maine Cernota & Curran; Gary McFaline

(57) ABSTRACT

A method of determining a point-of-impact of a ballistic projectile comprising: within a predetermined site using a weapon comprising a barrel, a camera, and an IMU configured to provide data concerning barrel attitude: detecting a firing event associated with the weapon; obtaining metadata associated with the weapon; determining estimated pointing angles of the weapon; obtaining a reference image of the site; culling portions of the reference image not associated with the estimated pointing angles, creating a culled reference image; projecting the culled reference image onto an image plane; obtaining an image from the weapon-mounted camera, the image being centered on the pointing direction weapon at the time of firing; registering the image from the weapon-mounted camera with the culled reference image; and calculating the true pointing angles of the weapon based on the alignment of the image obtained by the weapon-mounted camera with the culled reference image.

20 Claims, 8 Drawing Sheets

(56) References Cited

U.S. PATENT DOCUMENTS

| | | |
|---|---|---|
| 10,325,411 B1 | 6/2019 | Laney et al. |
| 10,366,549 B1 | 7/2019 | Mash |
| 10,694,148 B1 | 6/2020 | Li et al. |
| 10,907,971 B2 | 2/2021 | Roumeliotis et al. |
| 10,929,713 B2 | 2/2021 | Chiu et al. |
| 11,466,990 B2 | 10/2022 | Roumeliotis et al. |
| 11,544,161 B1 | 1/2023 | Yarlagadda et al. |
| 2004/0050240 A1* | 3/2004 | Greene .................... F41A 23/24 89/41.06 |
| 2007/0070069 A1 | 3/2007 | Samarasekera et al. |
| 2010/0295942 A1* | 11/2010 | Jekel ........................ F41G 3/26 348/139 |
| 2011/0218733 A1 | 9/2011 | Hamza et al. |
| 2013/0130205 A1* | 5/2013 | Matthews ............. F41G 3/2655 235/404 |
| 2013/0314509 A1 | 11/2013 | Laine et al. |
| 2015/0286217 A1 | 10/2015 | Qian et al. |
| 2017/0329335 A1 | 11/2017 | DelMarco et al. |
| 2018/0091746 A1 | 3/2018 | Benser et al. |
| 2019/0051056 A1 | 2/2019 | Chiu et al. |
| 2019/0368877 A1 | 12/2019 | O'Shea et al. |
| 2021/0048821 A1 | 2/2021 | Bondurant et al. |
| 2022/0006557 A1 | 1/2022 | Pierson et al. |

OTHER PUBLICATIONS

Delmarco, S., Webb, H., and Tom, V., "A Progressive Refinement Approach to Aerial Image Registration Using Local Transform Perturbations," Proceedings of the IEEE International Geoscience and Remote Sensing. Symposium, vol. 2, pp.: 1100-1103, 2008.

Delmarco, S., "Multi-Template Image Matching Using Alpha-Rooted Biquaternion Phase Correlation with Application to Logo Recognition," Proceedings of SPIE, vol. 8063, 2011.

Delmarco, S., "Multiple Template-Based Image Matching Using Alpha-Rooted Quaternion Phase Correlation," Proceedings of SPIE, vol. 7708, 2010.

Delmarco, S., "Logo Recognition Using Alpha-Rooted Phase Correlation in the Radon Transform Domain," Proceedings of SPIE, vol. 7443, 2009.

Delmarco, S., Tom, V., Webb, H., and Lefebvre, D., "A Verification Metric for Multi-Sensor Image Registration," Proceedings of SPIE, vol. 6567, 2007.

Delmarco, S., Webb, H., and Tom, V., "Automatic Spatial Accuracy Estimation for Correlation-Based Image Registration," Proceedings of SPIE, vol. 10993, 2019.

"A Novel Approach for Fusing LIDAR and Visual Camera images in Unstructured environment" International Conference on Advanced Computing and Communication Systems (ICACCS—2017), Jan. 6-7, 2017, Coimbatore, India.

Anderson Lebbad, C. Nataraj "A Bayesian Algorithm for Vision Based Navigation of Autonomous Surface Vehicles" 2015 IEEE 7th International Conference on Cybernetics and Intelligent Systems (CIS) and IEEE Conference on Robotics, Automation and Mechatronics (RAM), Siem Reap, Cambodia, 2015, pp. 59-64, doi: 10.1109/ICCIS.2015.7274597.

Ben Mildenhall et al. "NeRF: Representing Scenes as Neural Radiance Fields for View Synthesis" 17 pages.

Cesar Debeunne et al. "A Review of Visual-LiDAR Fusion based Simultaneous Localization and Mapping" Published Apr. 7, 2020, retrieved from the internet www.mdpi.com/journal/sensors, Sensors 2020, 20, 2068; doi:10.3390/s20072068.

Darshan Bhanushali et al. "LiDAR—Camera Fusion for 3D Object Detection" in Proc. IS&T Int'l. Symp. on Electronic Imaging: Autonomous Vehicles and Machines, 2020, pp. 257-1-257-9, https://doi.org/10.2352/ISSN.2470-1173.2020.16.AVM-257.

Hyunggi Jo et al. "New Monte Carlo Localization Using Deep Initialization: A Three-Dimensional LiDAR and a Camera Fusion Approach" vol. 8 2020, School of Electrical and Electronic Engineering, Yonsei University, Seoul 03722, South Korea.

Jing Li et al. "OpenStreetMap-Based Autonomous Navigation for the Four Wheel-Legged Robot Via 3D-Lidar and CCD Camera" in IEEE Transactions on Industrial Electronics, vol. 69, No. 3, pp. 2708-2717, Mar. 2022, doi: 10.1109/TIE.2021.3070508.

Johannes Graeter et al. "LIMO: Lidar-Monocular Visual Odometry" 2018 IEEE/RSJ International Conference on Intelligent Robots and Systems (IROS), Madrid, Spain, 2018, pp. 7872-7879, doi: 10.1109/IROS.2018.8594394.

Mao Shan et al "Probabilistic Egocentric Motion Correction of Lidar Point Cloud and Projection to Camera Images for Moving Platforms" 2020 IEEE 23rd International Conference on Intelligent Transportation Systems (ITSC), Rhodes, Greece, 2020, pp. 1-8, doi: 10.1109/ITSC45102.2020.9294601.

Naman Patel et al. "Sensor Modality Fusion with CNNs for UGV Autonomous Driving Indoor Environments" 8 pages.

Notice of Allowance of U.S. Appl. No. 18/474,817, mail date Jan. 8, 2025, 17 pages.

Qi Kong et al. "Outdoor real-time RGBD sensor fusion of stereo camera and sparse lidar" (2022) J. Phys.: Conf. Ser. 2234 012010, doi: 10.1088/1742-6596/2234/1/012010.

Qingqu Wang et al. "On SLAM Based on Monocular Vision and Lidar Fusion System" 2018 IEEE CSAA Guidance, Navigation and Control Conference (CGNCC), Xiamen, China, 2018, pp. 1-5, doi: 10.1109/GNCC42960.2018.9018987.

Qingquan Li et al. "A Sensor-Fusion Drivable-Region and Lane-Detection System for Autonomous Vehicle Navigation in Challenging Road Scenarios" IEEE Transactions on Vehicular Technology, vol. 63, No. 2, p. 540-555, Feb. 2014.

Sara Fridovich-Keil et al. "Plenoxels: Radiance Fields without Neural Networks" 2022 IEEE/CVF Conference on Computer Vision and Pattern Recognition (CVPR), New Orleans, LA, USA, 2022, pp. 5491-5500, doi: 10.1109/CVPR52688.2022.0054.

Sebastion Schneider et al. "Fusing Vision and LIDAR—Synchronization, Correction and Occlusion Reasoning" 2010 IEEE Intelligent Vehicles SymposiumUniversity of California, San Diego, CA, USA Jun. 21-24, 2010, 6 pages.

Shahram Moafipoor et al. "LiDAR/Camera Point & Pixel Aided Autonomous Navigation" LiDAR Magazine, vol. 7 No. 7, 7 pages, https://lidarmag.com/2017/10/25/lidarcamera-point-pixel-aided-autonomous-navigation/.

Shi-Sheng Huang et al. "Lidar-Monocular Visu9al Odometry using Point and Line Features" 2020 IEEE International Conference on Robotics and Automation (ICRA), Paris, France, 2020, pp. 1091-1097, doi: 10.1109/ICRA40945.2020.9196613.

Stephan J. Garbin et al. "FastNeRF: High-Fidelity Neural Rendering at 200FPS" 2021 IEEE/CVF International Conference on Computer Vision (ICCV), Montreal, QC, Canada, 2021, pp. 14326-14335, doi: 10.1109/ICCV48922.2021.01408.

Stephen Delmarco et al. "High-Precision Infantry Training System (HITS)" Proceedings of the 33rd International Technical Meeting of the Satellite Division of The Institute of Navigation (ION GNSS+ 2020), Sep. 2020, pp. 2579-2589.https://doi.org/10.33012/2020.17741.

Stephen Delmarco, Helen Webb, Victor Tom "Automatic Spatial Accuracy Estimation Correlation-based Image Registration" Proc. SPIE 10993, Mobile Multimedia/Image Processing, Security, and Applications 2019, 1099307 (May 13, 2019); doi: 10.1117/12.2518183.

Stephen Delmarco, Helen Webb, Victor Tom "Spectrally-shaped Correlation With Application to Image Registration" Proc. SPIE 10993, Mobile Multimedia/Image Processing, Security, and Applications 2019, 1099306 (May 13, 2019);doi: 10.1117/12.2518171.

Xiangmo Zhao et al. "Fusion of 3D LIDAR and Camera Data for Object Detection in Autonomous Vehicle Applications" IEEE Sensors Journal, vol. 20, No. 9, May 1, 2020, 13 pages.

Yilin Zhang "LIDAR—camera deep fusion for end-to-end trajectory planning autonomous vehicle" 2022 J. Phys.: Conf. Ser. 2284 012006, retrieved from the internet: https://iopscience.iop.org/article/10.1088/1742-6596/2284/1/012006, DOI: 10.1088/1742-6596/2284/1/012006.

Young-Sik Shin et al. "Direct Visual SLAM using Sparse Depth for Camear-LiDAR System" 2018 IEEE International Conference on Robotics and Automation (ICRA), Brisbane, QLD, Australia, 2018, pp. 5144-5151, doi: 10.1109/ICRA.2018.8461102.

\* cited by examiner

HIGH-PRECISION INFANTRY TRAINING SYSTEM (HITS)

STATEMENT OF GOVERNMENT INTEREST

This invention was made with government support under contract number HQ0727-16-D-0002 awarded by the Air Force. The United States Government has certain rights in the invention.

FIELD OF THE DISCLOSURE

The following disclosure relates generally to training devices and, more specifically, to day and night, weapon-mounted ballistics point-of-impact detection systems.

BACKGROUND

Effective infantry training is a key driver of infantry readiness for combat operations. For infantry training, accurate knowledge of pointing direction and position of soldier-carried weapons is essential for the precise evaluation of "red force" (i.e. opposing force in training) target hit statistics during infantry training. Current, laser-based systems require an un-obstructed view of the target, and are easily defeated by smoke, obstructions, and weather effects. These systems use laser detectors attached to red force actors to declare a target hit, and can be easily blocked to counter the system.

Furthermore, the current systems offer no transition path to live combat operations. For example, laser-based systems are unable to lead the target, as there is no mechanism to detect the laser signal unless it is received by the detector mounted on the soldier. Also, laser systems provide unrealistic trajectory paths, as they do not model true ballistic trajectories. Laser systems provide unrealistic lethality ranges, reaching beyond that of typical weapon effectiveness ranges. Furthermore, hardware attachments to the weapon interfere with combat equipment.

What is needed, therefore, is a modern infantry training system that overcomes the limitations of laser-based technology, and which transitions to use on the battlefield.

SUMMARY

To meet these dual needs, we disclose a system herein referred to as the High-precision Infantry Training System (HITS). HITS embodiments provide a day/night, weapon-mounted ballistics point-of-impact detection system that is suitable for use in live force-on-force training at Combat Training Centers (CTCs).

HITS embodiments are hardware agnostic, but can be configured to leverage standardized EO and/or IR (Electro-Optical/Infra-Red) camera optic systems, such as BAE Systems' fielded FWS-I (Family-of-Weapons Sights-Individual), a weapon-mounted long-range infrared sensor that provides imagery, including a reticle bore-sighted to the host weapon (e.g. an M4 Carbine or M249 Squad Automatic Weapon (SAW)) that can operate in battlefield conditions. Such a configuration provides a ruggedized, low-SWaP, weapon-mounted platform for high-precision gun barrel pointing angle determination.

Unlike prior art systems, HITS embodiments take a passive approach to weapon pointing angle determination using computer vision techniques. More specifically, weapon pointing angle is determined by matching imagery collected from a weapon sight camera to a view from a pre-generated, geo-located reference site model.

HITS provides a unique and novel contribution to infantry training by obviating problems associated with current training systems, which require un-obstructed line-of-sight to the target. For instance, bushes, trees, smoke, and other obscurants easily block laser beams commonly used in active systems, resulting in lack of training realism, while HITS enables use of high-fidelity ballistics models together with models of the training sites, allowing it to function even in the present of such obscurants. Models account for hard and soft-covers in the projectile path thereby providing realistic projectile trajectories, increased training realism, and target hit accuracy. As a passive system, HITS is also resilient to interference and countermeasures.

HITS technology also fits seamlessly into Mixed Reality (MR) applications, for use in training or in live combat operations, providing a vast new enhanced training capability. Providing weapon position and orientation also enables proper placement of avatars in head-mounted visors, or other display devices, thereby increasing training realism. Through transition to operational scenarios, the infantry soldier fights with the same system with which they train, thereby increasing training and combat effectiveness.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

DETAILED DESCRIPTION

Figure 1:
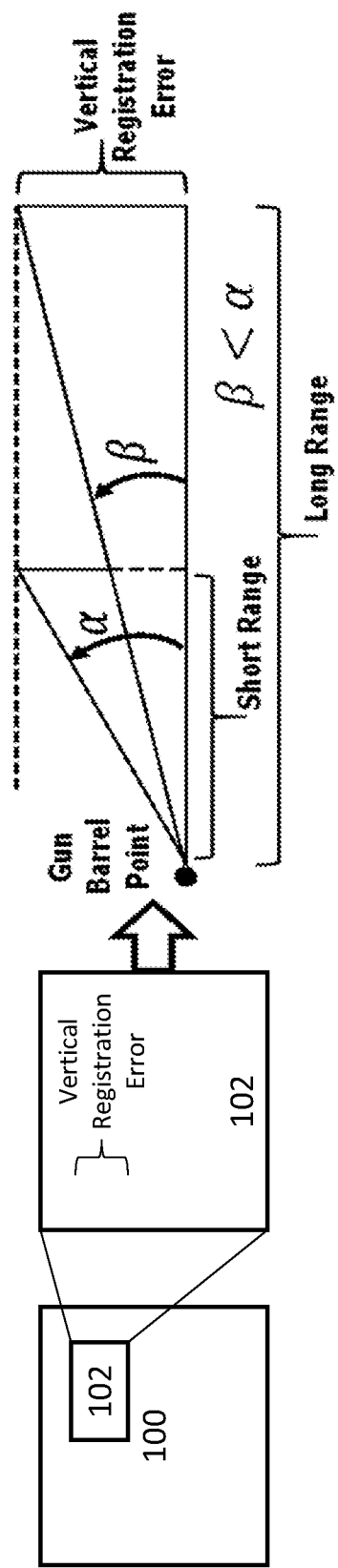
FIG. 1 is a schematic describing how an error, the constant pixel registration error, subtends a smaller angle at long range, compared to shorter ranges, in accordance with embodiments of the present disclosure.

HITS, in embodiments, uses computer-vision processing to calculate a weapon's 200 correct pointing angle, which may also be herein referred to as the "truth". In embodiments, an approximation of the truth is obtained from weapon-mounted inertial instruments 208, which is combined with a computer vision approach to estimate the true (or correct) pointing angles.

In embodiments, magnetometer 206 and Inertial Measurement Unit (IMU) 208 sensors provide approximate pointing direction information while a weapon-mounted video capture device 204, such as a camera 204, produces imagery with a field-of-view centered on the pointing direction of the weapon 200. In embodiments, these sensors are housed in a gunsight 202, such as an FWS-I gunsight 202, while, in other embodiments they are incorporated into a HITS system 202.

In embodiments, HITS 202 performs geometric alignment, or registration, of an IR, EO, FWS-I, or similar weapon sight camera-optic-system-acquired image 102 (generally referred to herein as a HITS image 102) to a reference image 100 of the view. The reference image 100 is created, in embodiments, by projecting a pre-generated reference model of a training or combat site (i.e. a predetermined site for which such data is available), comprising geo-located 3D LIDAR point-cloud data, a faceted 3D model, or other type of 3D model, onto an image plane. Using weapon sight location information, in embodiments obtained from a GPS-RTK 210 (GPS Real Time Kinematics-a more accurate version of traditional GPS that utilizes a correction stream in addition to the normal GPS signal to achieve 1 cm accuracy in real-time), accurate pointing angles are calculated from the image alignment. In embodiments, the system has a pointing accuracy of two milliradians or better, which is dependent primarily on camera resolution.

For instance, as a soldier progresses through a training mission, the HITS-equipped weapon 200 changes position and orientation. From two position fixes, the weapon location and the aim point, HITS 202 calculates barrel pointing angles. A weapon fire control solution can then be transmitted, in embodiments using a wireless receiver 212, to an external training server, for calculation of projectile trajectory, impact with any terrain or other obstructions along the trajectory, and red force actor hit status.

Achieving the high angular precision needed for these training systems presents a significant challenge using current technologies, such as inertial measurement units, angular sensors, and optics which lack the required resolution to function effectively. Where many modern stereo camera-based systems provide acceptable accuracies to approximately 30 meters, accuracy tapers off at the longer ranges at which training (and live combat operations) typically occur, HITS accuracy actually increases with increasing range, making it ideal for this application. HITS embodiments overcome this challenge by exploiting geometric parallax, which is also referred to as the lever-arm effect. More specifically, the present invention takes advantage of a displacement or difference in the apparent position of an object viewed along two different lines of sight, and is measured by the angle or semi-angle of inclination between those two lines.

Referring specifically to FIG. 1, by matching image feature content 102 to scene content 100 at long range, HITS embodiments achieve a pointing angle accuracy of about two milliradians or better, dependent primarily on camera resolution. More specifically, a constant pixel registration error subtends a relatively small angle ($\beta$) at long range and a relatively larger angle ($\alpha$) at short range, allowing the pointing angle accuracy to be calculated with sufficient accuracy at the relatively long ranges at which training occurs (better accuracy, in fact, than at short ranges), as is elaborated on further herein, including through the use of exemplary calculations.

Figure 2:
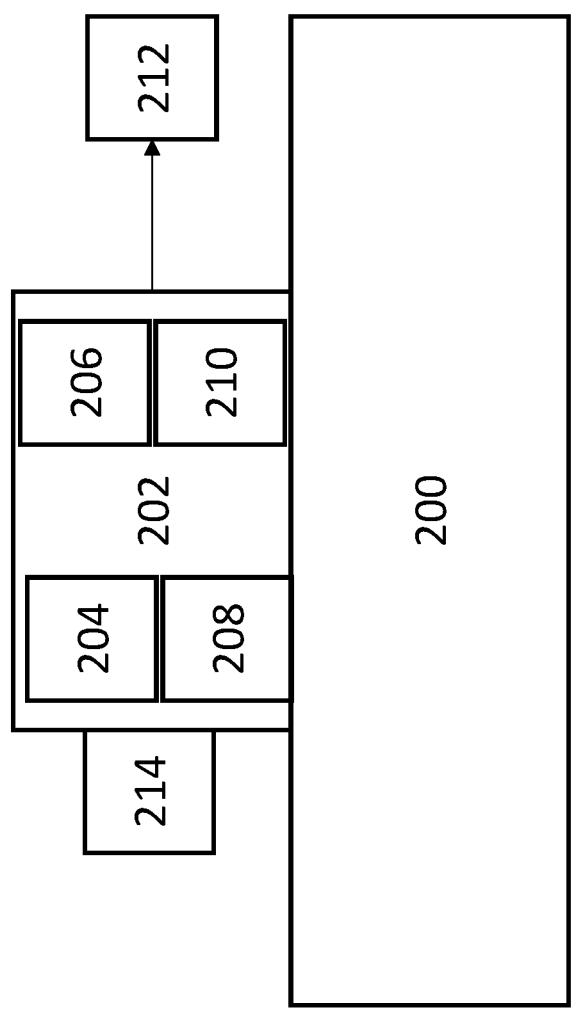
FIG. 2 is a schematic showing a high precision infantry training system equipped weapon, in accordance with embodiments of the present disclosure.

FIG. 2 depicts an embodiment of a HITS-equipped weapon 200. The weapon 200 is operably connected to the HITS system 202. HITS system 202 may include a camera 204, a magnetometer 206, an IMU 208 configured to provide gun barrel attitude data/metadata, a GPS module 210, a wireless transceiver 212, and a viewport 214 configured to allow a user thereof to use the HITS system 202 as a weapon-mounted sight. In this context (and as used elsewhere in this specification), metadata, i.e. a set of data that describes and gives information about other data, is used to describe the information provided by the IMU 208 because that information provides further information about images captures by the camera 204, which is used to obtain the high angular precision described herein.

In some embodiments, the camera 204 may be an IR camera to produce IR imagery of the scene. In some embodiments, the GPS module 210 may be a GPS-RTK module. Further, the wireless transceiver 212 may be configured to transmit information to a remote server or even a second weapon (not depicted) or similar for processing and/or to alert a trainee to a "hit".

In an embodiment of the HITS system 202, a trigger pull or other weapon discharge action, such as detected recoil, causes the HITS system 202 to extract a video frame, discharge time and associated metadata. Metadata may include, but is not limited to, a training weapon identifier, an operator identifier, weapon 200 attitude, weapon 200 GPS coordinates, target information, and other metadata that may support the training mission. The image and metadata, in embodiments, transmits wirelessly, using a wireless communications link 212, such as the Alereon® wireless communication link, to an off-weapon processor, such as a Tegra® processor, which runs software configured to process the data. As one of ordinary skill in the art would know, however, any off-weapon processing unit or system could be configured to provide the needed functionality.

Figure 3:
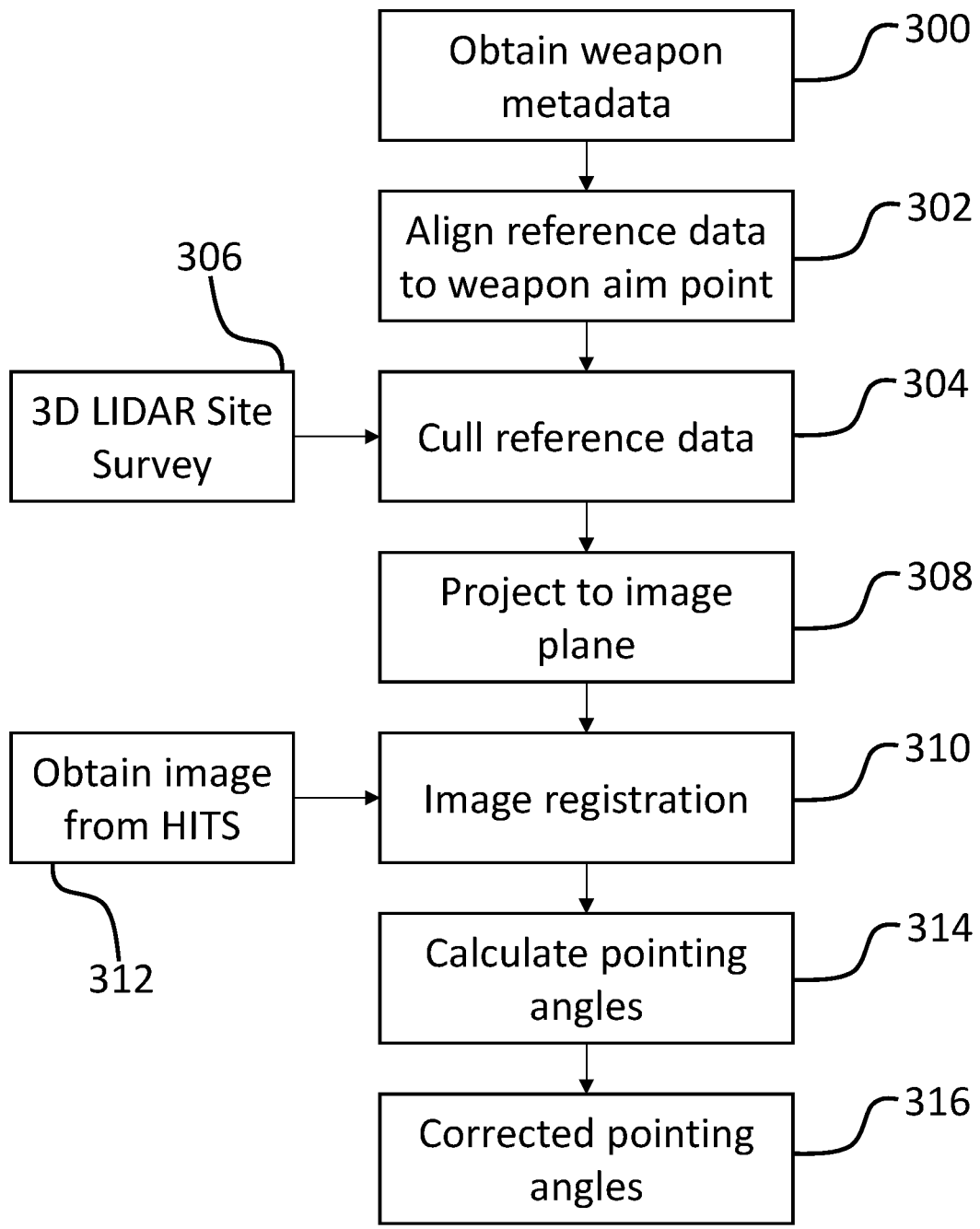
FIG. 3 is a flowchart describing a high-level processing flow of a high precision infantry training system, in accordance with embodiments of the present disclosure.

FIG. 3 describes a high-level processing flow of a HITS system 202 in accordance with an embodiment of the present disclosure. At step 300, which, in embodiments occurs after detection of a gunshot, the system obtains metadata. Metadata may include data specific to the weapon type in use and data related to the orientation of the weapon 200 to a reference frame. The orientation data may be characterized by one or more quaternions.

In some embodiments, the metadata may include coordinate and position data of the weapon obtained from a GPS module, such as GPS module 210 described in FIG. 2. The GPS module 210 may be a GPS-RTK module, as previously described.

Next, a view of the weapon 200, i.e. its point-of-aim, is aligned to reference data 302, in embodiments obtained by a site survey, such as a 3D LIDAR site survey 306. Unnecessary reference data, i.e. that outside of a field of view associated with the weapon 200, can then be culled 304. In embodiments, the weapon's 200 point of aim is inferred from location and orientation data, in embodiments obtained from a GPS module 210 and inertial measurement unit 208, respectively.

The culled reference data is then projected onto an image plane 308, after which an image acquired from the HITS system 202 is obtained 312 and aligned thereto, via an image registration process 310.

Next, pointing angles are calculated 314. In embodiments, pointing angles are calculated in a loop and new pointing angles replace or correct previously-calculated (or, in embodiments, estimated based on location and angular data obtained from sensors) pointing angles 316. For example, in embodiments pointing angles are first calculated at step 314 using weapon-mounted inertial measurement devices 208. Pointing angles are then corrected at step 316 using pointing angles calculated based on the aforementioned image registration 310 process to determine the correct pointing angle. Pointing angle correction may be performed by replacing the previously-calculated pointing angle, generating a correction thereto, or other methods known in the art. In embodiments, a correction is applied to subsequent pointing angles determined using the weapon-mounted inertial measurement device(s).

Figure 4:
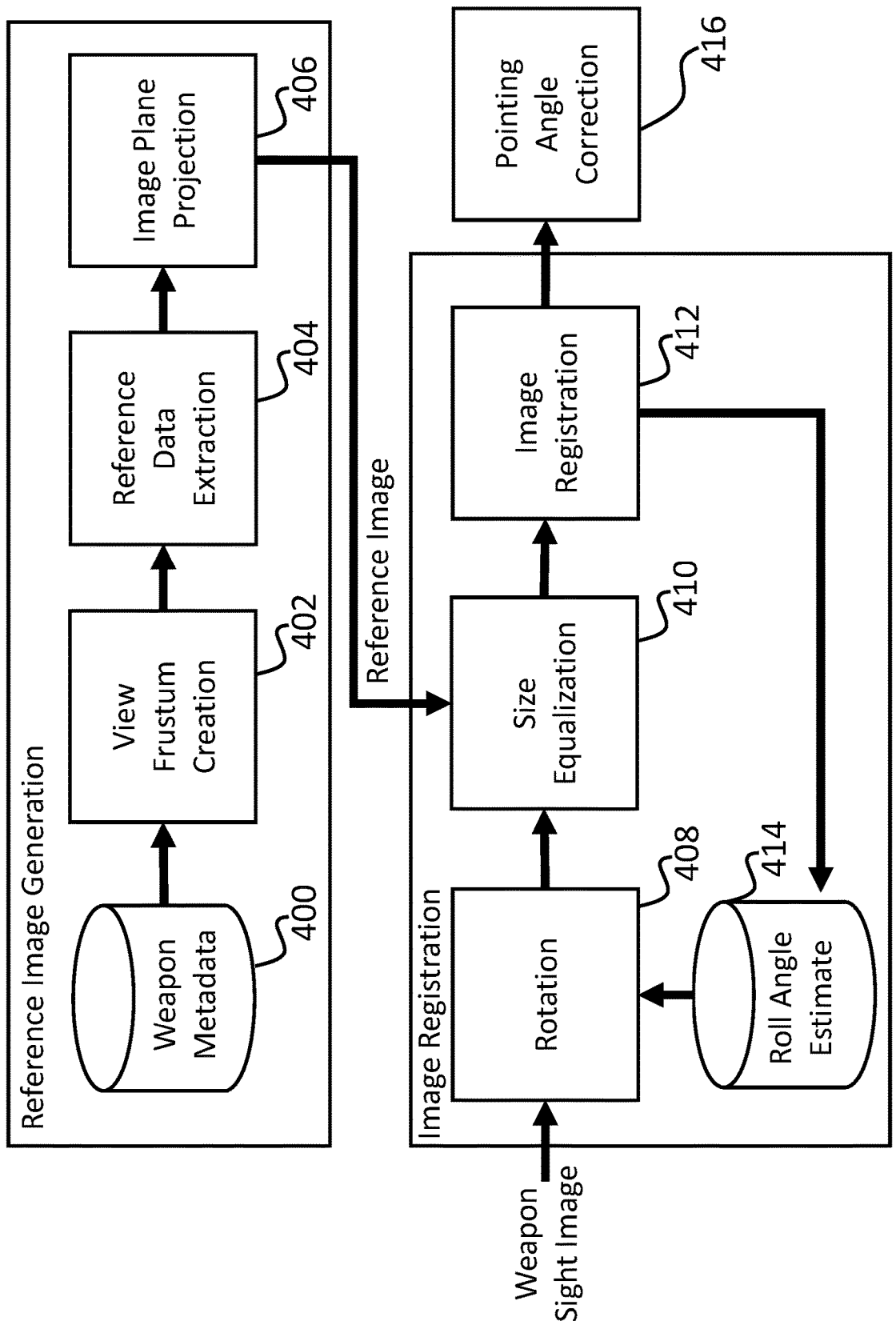
FIG. 4 is a flowchart describing a detailed processing flow of a high precision infantry training system, in accordance with embodiments of the present disclosure.
Figure 5:
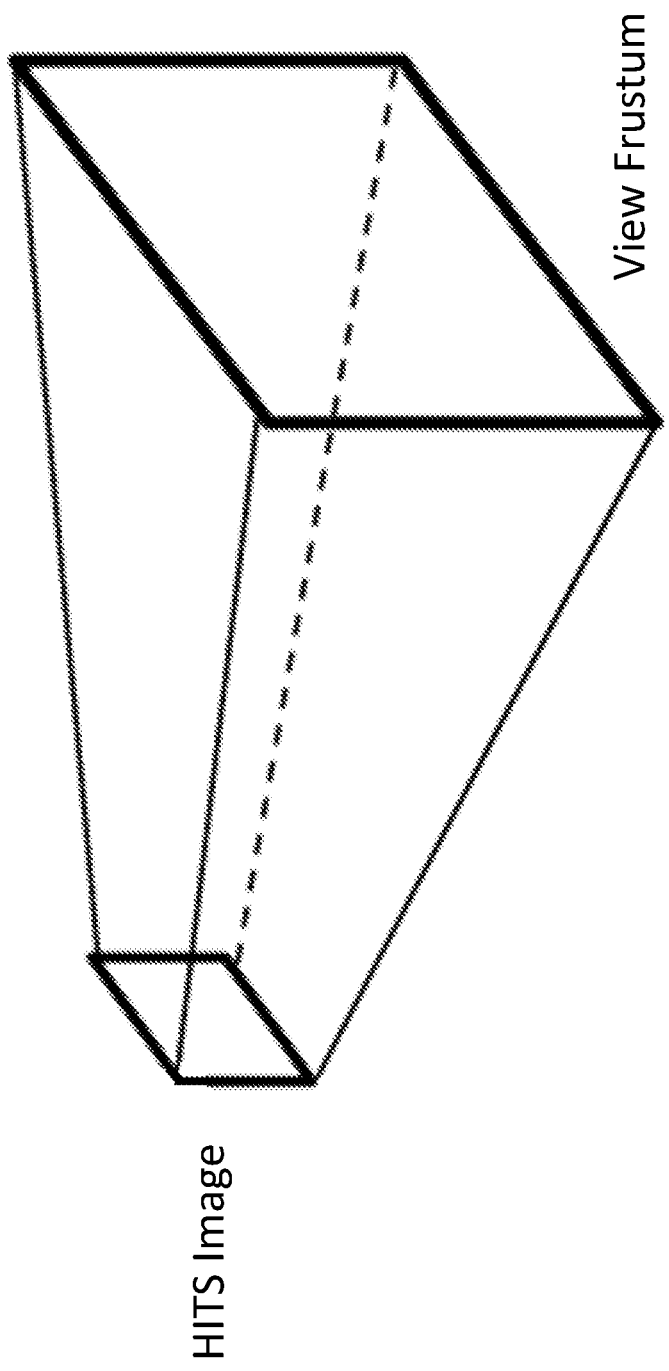
FIG. 5 is a diagram describing a view frustum created by a high precision infantry training system, in accordance with embodiments of the present disclosure.

FIG. 4 shows the HITS processing flow of embodiments. More specifically, upon a detection of weapon discharge, such as a trigger pull or recoil event, the system extracts a video frame from the HITS system 202 along with associated metadata 400. In embodiments, the weapon's position and orientation is used to create a view frustum 402, as notionally portrayed in FIG. 5, which intersects with 3D reference site data 100. In embodiments, the 3D reference site data 100 is point cloud data. Reference data 100 within the view frustum can then be extracted from this the 3D reference site data 100 404 and projected onto an image plane 406. The image is then rotated 408, scaled 410, and registered 412 to a reference image 100, obtained beforehand to obtain a pointing angle correction 416 that can be applied to an initial estimate, in embodiments obtained via weapon-mounted inertial measurement device(s) 208 in combination with weapon-mounted GPS module(s) 210 and/or the HITS system 202 generally, to obtain the weapon's 200 true pointing angle to a high degree of accuracy.

The view frustum of embodiments is widened to account for errors in the metadata, which ensures, with high probability, that the HITS image 102 will reside within the view frustum and thus within the reference image 100, so that image registration 310 can be performed, with the view frustum representing a truncated pyramid of infinite extent emanating from the image plane.

In embodiments, the reference data 100 is a 3-D model of a site 100, for instance a training site, when the system is used for training. The reference data/3D model of the site 100, which may also be herein referred to as a reference model 100 or reference site model 100, in embodiments, contains models of the objects in the site, for example, buildings, walls, telephone poles, terrain undulations, trees, other fixed structures. In embodiments, the reference site model contains only models of the fixed or permanent objects in the site, so for example, would not model transient objects, such as cars or people moving through the site.

The purpose of the reference data 100 of embodiments is to provide a fixed reference, for use in generating reference imagery 100 that truly displays what is in a particular scene, so that the HITS image 102 can be matched against the reference imagery 100 for pointing angle correction. In other words, the reference data 100 of embodiments is meant to provide a true characterization of the permanent objects in the site.

In embodiments, the image registration process iterates over a roll angle hypothesis 414, to account for errors in roll angle metadata. A roll angle hypothesis 414 is chosen, the weapon sight image 102 is rotated 408, and the size of rotated image is equalized 410 to the reference image 100, prior to invoking a core image registration processing 412.

Figure 6:
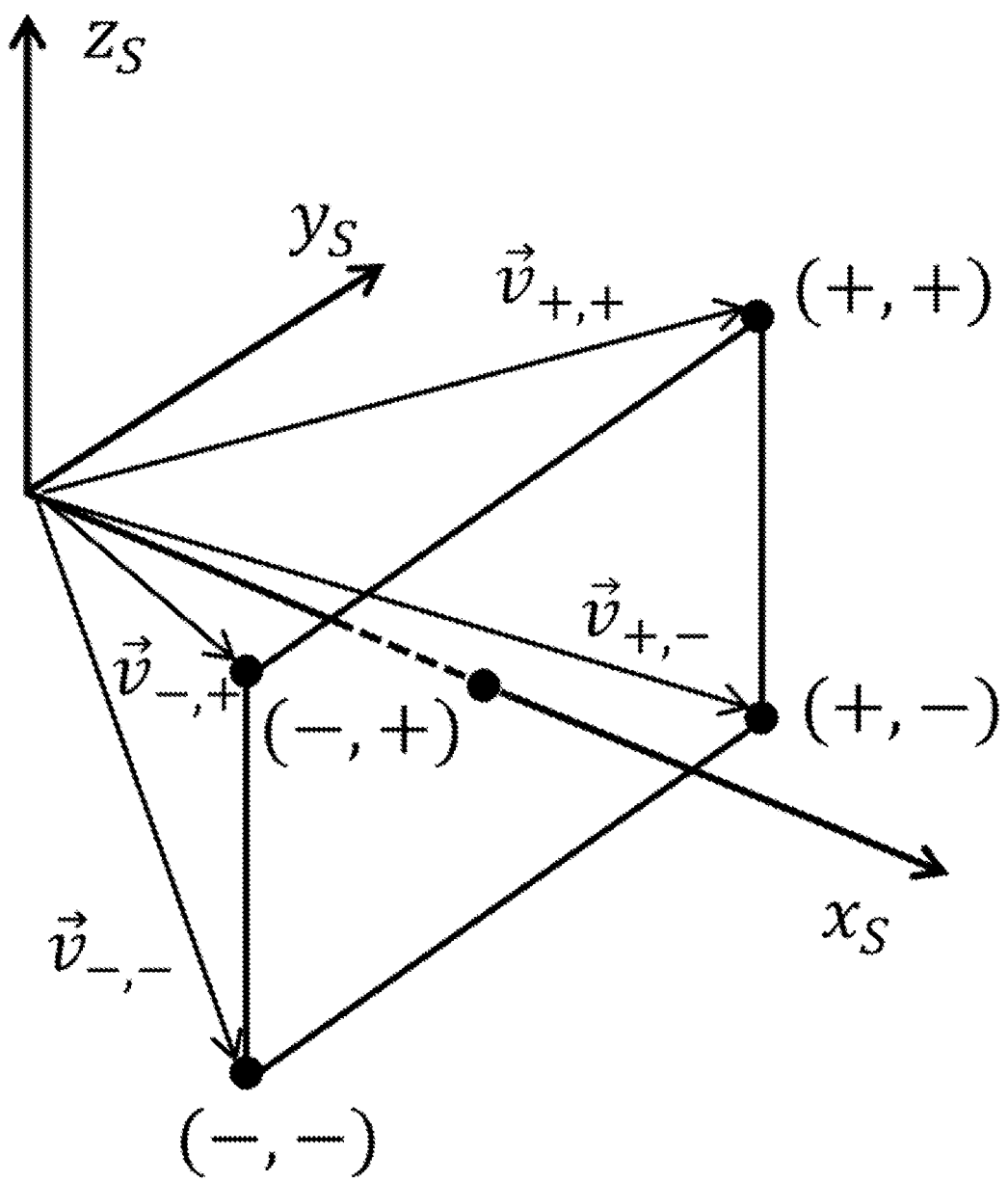
FIG. 6 is a diagram describing view frustum generation, in accordance with embodiments of the present disclosure.

View frustum generation 402 in accordance with embodiments proceeds as shown in FIG. 6. More specifically, rays, which are also herein referred to as vectors, emanating from the camera origin project through the image plane boundary vertices to encompass a three-dimensional region of space. These vectors, through each image boundary vertex (indicated by + and − designations), are transformed to a reference frame G to produce vectors $\vec{v}_{+,+}^{G}$. The view frustum intersects, in embodiments, with a 3D site reference point cloud 100 to determine the point cloud points that reside inside the view frustum. In embodiments, to determine the intersection comprises defining normal vectors to each side of the four view frustum sides shown in FIG. 6. These normal vectors, illustrated in FIG. 7, in embodiments, are created as:

$$\vec{v}_{(+,-)\times(+,+)}^{G} = \vec{v}_{+,-}^{G} \times \vec{v}_{+,+}^{G},$$

$$\vec{v}_{(+,+)\times(-,+)}^{G} = \vec{v}_{+,+}^{G} \times \vec{v}_{-,+}^{G},$$

$$\vec{v}_{(-,+)\times(-,-)}^{G} = \vec{v}_{-,+}^{G} \times \vec{v}_{-,-}^{G},$$

$$\vec{v}_{(-,-)\times(+,-)}^{G} = \vec{v}_{-,-}^{G} \times \vec{v}_{+,-}^{G}.$$

Figure 7:
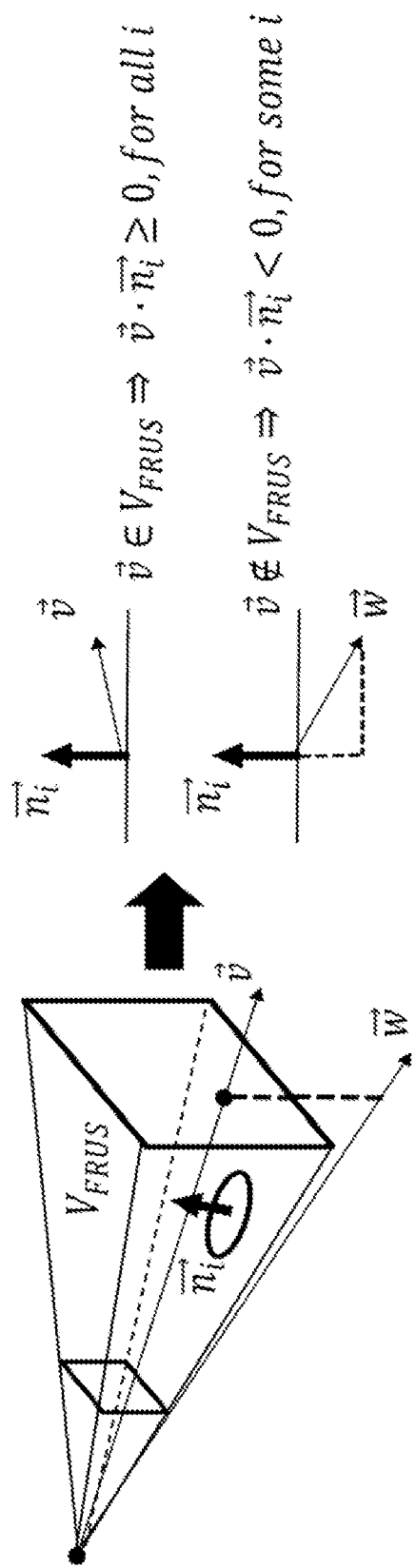
FIG. 7 is a depiction of view frustum culling, in accordance with embodiments of the present disclosure.

As depicted in FIG. 7, the dot product of the range vector, $\vec{v}$, from the sensor origin to the point cloud data point, with the normal vector to each of the four frustum faces, must be non-negative for the range vector to reside inside of the view frustum.

Thus, the condition for intersection of the view frustum with a data point, in embodiments a point cloud data point, is the simultaneous satisfaction of the four dot product equations:

$$\vec{v} \cdot \vec{v}_{(+,-)\times(+,+)}^{G} \geq 0,$$

$$\vec{v} \cdot \vec{v}_{(+,+)\times(-,+)}^{G} \geq 0,$$

$$\vec{v} \cdot \vec{v}_{(-,+)\times(-,-)}^{G} \geq 0,$$

$$\vec{v} \cdot \vec{v}_{(-,-)\times(+,-)}^{G} \geq 0.$$

The view frustum reference points of embodiments project onto the image plane 406 to create a reference image 100. The reference image 100 together with the weapon sight image 102 are then, in embodiments, input to an image registration loop 412 to align the imagery. The alignment solution then feeds the corrected pointing angle calculation 416.

In embodiments, the image registration loop 412 iterates over a roll angle hypothesis 414, to account for errors in roll angle metadata. A roll angle hypothesis 414 is chosen, the weapon sight image 102 is rotated 408, and the size of rotated image is equalized 410 to the reference image 100, prior to invoking a core image registration processing 412.

In embodiments, an image registration algorithm referred to as Spectrally-Shaped Correlation (SSC) that works well on cross-modality imagery is employed. SSC is discussed in the following publications of the inventor, which are hereby incorporated by reference, in their entirety, for all purposes: DelMarco, S., Webb, H., and Tom, V., "Spectrally-Shaped Correlation with Application to Image Registration," Proceedings of SPIE, Vol. 10993, 2019.

DelMarco, S., Webb, H., and Tom, V., "A Progressive Refinement Approach to Aerial Image Registration Using Local Transform Perturbations," Proceedings of the IEEE International Geoscience and Remote Sensing. Symposium, Vol. 2, pp.: 1100-1103, 2008.

DelMarco, S., Webb, H., and Tom, V., "SAR-to-EO Image Registration Using Phase Correlation," Automatic Target Recognition Working Group (ATRWG), Cambridge, MA, Sep. 9-11, 2008.

DelMarco, S., Webb, H., and Tom, V., "Video Frame Georegistration for Small FOV Imagery to an EO Orthoreference," Automatic Target Recognition Working Group (ATRWG), Cambridge, MA, Sep. 9-11, 2008.

DelMarco, S., "Multi-Template Image Matching Using Alpha-Rooted Biquaternion Phase Correlation with Application to Logo Recognition," Proceedings of SPIE, Vol. 8063, 2011.

DelMarco, S., "Multiple Template-Based Image Matching Using Alpha-Rooted Quaternion Phase Correlation," Proceedings of SPIE, Vol. 7708, 2010.

DelMarco, S., "Logo Recognition Using Alpha-Rooted Phase Correlation in the Radon Transform Domain," Proceedings of SPIE, Vol. 7443, 2009.

Notably, SSC provides enhancements to classical phase correlation, by re-shaping the image spectrum to enable registration in difficult cases where feature-based approaches often fail.

To define SSC, first let f(m, n), g(m, n) denote two images with associated 2D Fourier transforms, F(u, v), G(u, v), which are assumed to be non-zero. Then define continuous homotopic functions (morphing functions) $h_f(\|F(u, v)\|, u, v, \alpha_f)$, $h_g(\|G^*(u, v)\|, u, v, \alpha_g)$ that are functions of the Fourier magnitudes, frequencies u, v, and homotopy parameters $0 \leq \alpha_f, \alpha_g \leq 1$.

Take:

$$h_f(\|F(u, v)\|, u, v, 0) = 1, \quad h_f(\|F(u, v)\|, u, v, 1) = \|F(u, v)\|,$$

$$h_g(\|G*(u, v)\|, u, v, 0) = 1, \quad h_g(\|G*(u, v)\|, u, v, 1) = \|G*(u, v)\|.$$

Figure 8:
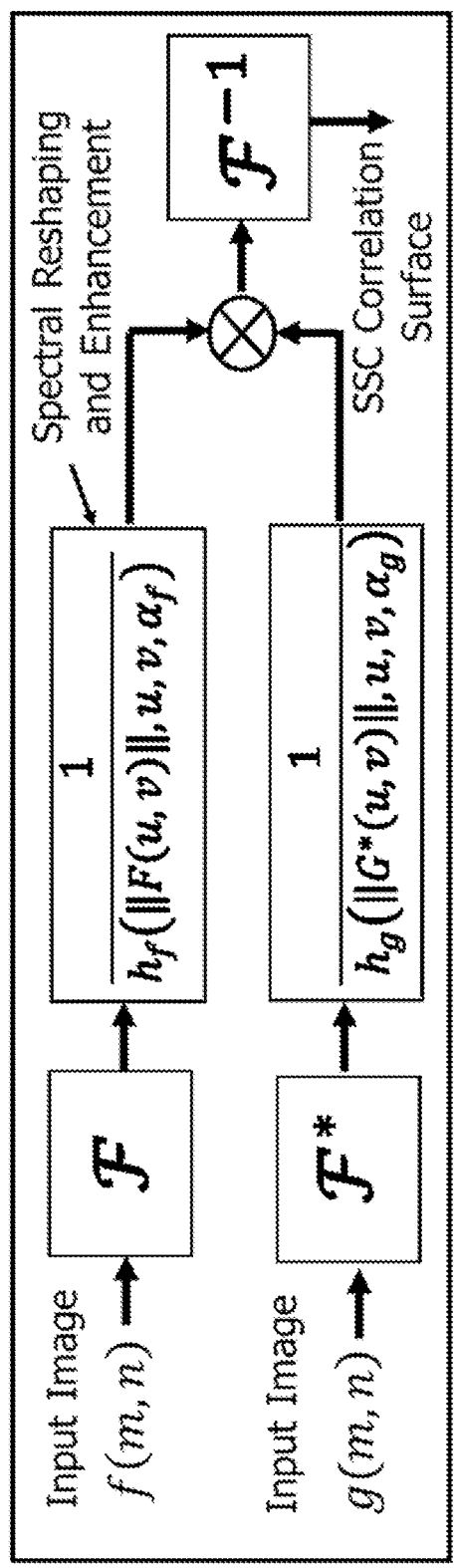
FIG. 8 is a Fourier domain definition of spectrally-shaped correlation, in accordance with embodiments of the present disclosure These and other features of the present embodiments will be understood better by reading the following detailed description, taken together with the figures herein described. The accompanying drawings are not intended to be drawn to scale. For purposes of clarity, not every component may be labeled in every drawing.

Then define SSC by modifying the Fourier domain expression for correlation, as depicted in FIG. 8, for Fourier operator F:

$$\mathcal{F}\{f, g\}(u, v) = \frac{F(u, v) G*(u, v)}{h_f(\|F(u, v)\|, u, v, \alpha_f) h_g(\|G^*(u, v)\|, u, v, \alpha_g)}.$$

The homotopy parameters $\alpha_f$, $\alpha_g$ are meant to transition between pure amplitude correlation and pure phase correlation. For $\alpha_f=0$, $\alpha_g=0$ and $\alpha_f=1$, $\alpha_g=1$, we obtain, respectively, $$\mathcal{F}\{f, g\}(u, v) = F(u, v) G*(u, v),$$

$$\mathcal{F}\{f, g\}(u, v) = \frac{F(u, v) G*(u, v)}{\|F(u, v)\| \|G*(u, v)\|}$$

which is classical amplitude correlation and classical phase correlation, respectively.

In embodiments, SSC has been specialized for use in HITS. The specialization of SSC used in HITS embodiments takes $$h_f(\|F(u, v)\|, u, v, \alpha_f) = \|F(u, v)\|^{\alpha_f},$$

$$h_g(\|G*(u, v)\|, u, v, \alpha_g) = \|G*(u, v)\|^{\alpha_g}.$$

With this specialization, the morphing parameters become alpha-rooting parameters and control the Fourier domain whitening of the imagery. They serve to equalize the image amplitude and emphasize high-frequency feature content where most image information exists.

The Fourier expression for SSC, F{f, g}(u, v), is then inverted, in embodiments, to provide a correlation surface. When two images align, the correlation surface exhibits a large spike at the position of the translational offset.

In embodiments, the search for the peak coefficient is limited to a smaller region of the full correlation surface, based on the a priori knowledge of the expected pointing angle errors from the pointing information metadata output from the gun sight.

Over the correlation surface, we typically use two match metrics to measure the registration alignment solution. One metric, called the Verification Metric (VM), represents a peak-to-sidelobe ratio. The VM is discussed in the following publications of the inventor, which are hereby incorporated by reference, in their entirety, for all purposes: DelMarco, S., Tom, V., Webb, H., and Lefebvre, D., "A Verification Metric for Multi-Sensor Image Registration," Proceedings of SPIE, Vol. 6567, 2007.

The VM of embodiments comprises a statistical Z-score normalization of the correlation surface and provides the number of standard deviations of the peak coefficient above the background. For peak coefficient value $c_{MAX}$, mean coefficient value $\mu$, and standard deviation $\sigma$, the VM is given by $$VM = \frac{c_{MAX} - \mu}{\sigma}.$$

A second metric, used in embodiments on well-behaved correlation surfaces, is the Spatial Accuracy Metric (SAM). The SAM is discussed in the following publications of the inventor, which are hereby incorporated by reference, in their entirety, for all purposes: DelMarco, S., Webb, H., and Tom, V., "Automatic Spatial Accuracy Estimation for Correlation-Based Image Registration," Proceedings of SPIE, Vol. 10993, 2019.

The SAM measures the registration alignment spatial accuracy. It works by fitting a two-dimensional Gaussian function to a region of the peak correlation surface coefficient. The covariance of the Gaussian least-squares fit serves as a measure of the spatial accuracy.

Now regarding determining the pointing angle, the alignment solution provides a two-dimensional translation vector $(t_x, t_y)$ in image pixel space. From this translation vector, a corrected pointing vector expressed in sensor frame coordinates, $(x_S, y_S, z_S)$, in embodiments, is calculated. Yaw and pitch Euler angles are calculated to construct a transformation from the sensor frame to a new sensor frame aligned with the corrected pointing direction; the correctly-aligned sensor (CAS) frame. The Euler angles are calculated as:

$$\theta_{YAW} = \tan^{-1}\left(\frac{y_S}{x_S}\right),$$

$$\theta_{PITCH} = \tan^{-1}\left(\frac{-z_S}{\sqrt{x_S^2 + y_S^2}}\right).$$

In embodiments, we use Euler angles $\theta_{YAW}$ and $\theta_{PITCH}$ to create a transformation matrix from the new, correctly-aligned sensor frame (CAS) to the original sensor frame, $T_{CAS}{}^S$. We create the transformation from the CAS frame to the reference frame G frame via $$T_{CAS}{}^G = T_S{}^G T_{CAS}{}^S.$$

We create the body to corrected sensor frame transformation $$T_B{}^{CAS} = T_M{}^S T_B{}^M$$

where $T_B{}^M$ denotes the transformation from the body frame to the camera mount frame, and $T_M{}^S$ denotes the transformation from the camera mount frame to the sensor frame. Note one subtle point; the camera mount frame is fixed to the body, and the camera is fixed to the camera mount frame, so transformation $T_M{}^S T_B{}^M$ is a fixed transformation to the sensor frame, which we interpret to be at a new orientation with respect to the reference frame. The new orientation is characterized by transformation $T_{CAS}{}^G$.

The weapon pointing direction is the unit vector in the body frame pointing along the body frame x-direction: $\vec{v}^B = (x_B, y_B, z_B)$, with $x_B = 1, y_B = 0,$ and $z_B = 0.$ We then transform the body pointing vector to the corrected sensor frame to obtain the gun barrel pointing vector in the corrected sensor frame.

$$\vec{v}^{CAS} = T_B{}^{CAS} \vec{v}^B$$

We then transform the pointing vector, expressed in the CAS frame, to the G frame via $\vec{v}^G = T_{CAS}{}^G \vec{v}^{CAS}$.

From the pointing direction expressed in G frame coordinates, we calculate the corrected azimuth and elevation pointing angles as:

$$\theta_{AZ} = \tan^{-1}\left(\frac{y_G}{x_G}\right),$$

$$\theta_{EL} = \tan^{-1}\left(\frac{z_G}{\sqrt{x_G^2 + y_G^2}}\right).$$

In this disclosure we presented a computer vision approach to calculating weapon 200 pointing angles. Passive determination of weapon 200 pointing angles precludes many of the problems associated with active systems, such as need for direct line-of-sight to the target. Simultaneously, the system can incorporate a high-fidelity ballistics model for physically realistic and accurate projectile trajectory modeling. This combination of features provides improved infantry readiness for combat operations.

HITS also provides a transition path to operational use, where models of the operational area can be created, as during a "Preparation of the Battlespace" activity. HITS has demonstrated robust performance over diverse scenes, lighting conditions, and noise characteristics, and has a two milliradian pointing angle accuracy or better, rendering it suitable for long-range use cases.

The teachings of this disclosure can also be used to supply the navigation technology (specifically, location and orientation) needed for enabling Mixed Reality or Augmented Reality applications. One application of the technology is a virtual marksmanship training application for infantry soldiers, in which HITS is used prior to use of live ammunition for target practice, to significantly reduce training cost. Another application is as a virtual tracer, in which HITS, together with a ballistics model, is used to calculate a projectile trajectory, to be displayed on a head-mounted visor, such as the Army's IVAS visor. The virtual tracer application would find use in combat operation by displaying bullet paths, while concealing these from the enemy. Other uses include the translation of targeting solutions produced by HITS from one weapon, into a targeting solution for a different weapon at a different location and view perspective.

Extension of this technology transitions directly into military weapons training and supporting range operations and training. The technology logically has commercial applications in weapons handling and commercial range training as well. Extension of this technology leads to knowledge of pointing sensors and providing geo-location of the targets. Commercial applications also include gaming and mixed reality/augmented reality applications.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A method of determining a point-of-impact of a ballistic projectile, the method comprising:
within a predetermined site and using a weapon comprising a barrel, a weapon-mounted camera, and a weapon-mounted inertial measurement unit configured to provide data relating to weapon barrel attitude:
detecting a firing event associated with the weapon;
obtaining metadata associated with the weapon;
determining estimated pointing angles of the weapon;
obtaining a reference image of the predetermined site;
culling portions of the reference image not associated with the estimated pointing angles of the weapon, creating a culled reference image;
projecting the culled reference image onto an image plane;
obtaining an image from the weapon-mounted camera, the image being centered on a pointing direction the weapon at the time of firing;
registering the image from the weapon-mounted camera with the culled reference image; and
calculating true pointing angles of the weapon based on an alignment of the image obtained by the weapon-mounted camera with the culled reference image.

2. The method of claim 1 wherein the firing event associated with the weapon is detected using an accelerometer mounted to the weapon that is configured to detect a recoil of the weapon.

3. The method of claim 1 wherein the weapon further comprises a weapon-mounted magnetometer configured to provide data relating to weapon barrel attitude.

4. The method of claim 1 wherein the weapon further comprises a Global Positioning System (GPS) receiver configured to provide weapon position information.

5. The method of claim 4 wherein weapon position and weapon barrel attitude information is used to create a view frustum which intersects with the reference image.

6. The method of claim 1 wherein the metadata comprises a quaternion that characterizes an orientation of the weapon-mounted camera to the reference image.

7. The method of claim 1 wherein the reference image is a 2D image generated from a 3D site model.

8. The method of claim 7 wherein the 3D site model is selected from the group consisting of 3D light detection and ranging (LIDAR) point-cloud data, a faceted 3D model, and 3D model.

9. The method of claim 1 wherein the weapon-mounted camera is selected from the group consisting of infrared cameras, electro-optical cameras, and visible wavelength cameras.

10. A system for determining a point-of-impact of a ballistic projectile, the system comprising:
a weapon comprising a barrel, a weapon-mounted camera, and a weapon-mounted inertial measurement unit; and
a processor in communication with the weapon-mounted camera and the weapon-mounted inertial measurement device, the processor configured to:
detect a firing event associated with the weapon;
obtain metadata associated with the weapon;
determine estimated pointing angles of the weapon;
obtain a reference image of a site corresponding to a location of the weapon;
cull portions of the reference image not associated with the estimated pointing angles of the weapon, creating a culled reference image;
project the culled reference image onto an image plane;
obtain an image from the weapon-mounted camera;
register the image from the weapon-mounted camera with the culled reference image; and
calculate true pointing angles of the weapon based on an alignment of the image obtained by the weapon-mounted camera with the culled reference image,
wherein the weapon-mounted camera is centered on a pointing direction of the weapon, and
wherein the weapon-mounted inertial measurement unit is configured to provide data relating to weapon barrel attitude to the processor.

11. The system of claim 10 wherein the firing event associated with the weapon is detected using an accelerometer mounted to the weapon that is configured to detect a recoil of the weapon.

12. The system of claim 10 wherein the weapon further comprises a weapon-mounted magnetometer configured to provide data relating to weapon barrel attitude and wherein the weapon-mounted magnetometer is in communication with the processor.

13. The system of claim 10 wherein the weapon further comprises a Global Positioning System (GPS) receiver configured to provide weapon position information and wherein the GPS receiver is in communication with the processor.

14. The system of claim 13 wherein weapon position and weapon barrel attitude information is used by the processor to create a view frustum which intersects with the reference image.

15. The system of claim 10 wherein the metadata associated with the weapon comprises a quaternion that characterizes an orientation of the weapon-mounted camera to the reference image.

16. The system of claim 10 wherein the reference image is a 2D image generated from a 3D site model.

17. The system of claim 16 wherein the 3D site model is selected from the group consisting of 3D light detection and ranging (LIDAR) point-cloud data, a faceted 3D model, and 3D model.

18. The system of claim 10 wherein the weapon-mounted camera is selected from the group consisting of infrared cameras, electro-optical cameras, and visible wavelength cameras.

19. An apparatus for determining a point-of-impact of a ballistic projectile, the apparatus comprising:
a camera, an inertial measurement unit; and
a processor in communication with the camera and the inertial measurement device, the processor configured to:
detect a firing event associated with a weapon;
obtain metadata associated with the weapon;
determine estimated pointing angles of the camera and/or inertial measurement unit;
obtain a reference image of a site corresponding to a location of the apparatus;
cull portions of the reference image not associated with the estimated pointing angles of the camera, creating a culled reference image;
project the culled reference image onto an image plane;
obtain an image from the camera;
register the image from the camera with the culled reference image; and
calculate the true pointing angles of the camera based on an alignment of the image obtained by the camera with the culled reference image,
wherein the camera and inertial measurement unit are configured to be mounted on the weapon,
wherein the camera is configured to be centered on a pointing direction of the weapon, once mounted thereto, and
wherein the weapon-mounted inertial measurement unit is configured to provide attitude data to the processor.

20. The apparatus of claim 19 further comprising a Global Positioning System (GPS) receiver configured to provide position information, wherein position and attitude information is used to create a view frustum which intersects with the reference image, and wherein the metadata comprises a quaternion that characterizes the orientation of the camera to the reference image.

* * * * *